(12) United States Patent
Geraud et al.

(10) Patent No.: US 12,450,214 B2
(45) Date of Patent: Oct. 21, 2025

(54) ELECTRONIC DEVICE FOR PROCESSING DATA UPDATE AND/OR INSERTION REQUESTS, METHOD AND CORRESPONDING PROGRAM

(71) Applicant: Banks and Acquirers International Holding, Suresnes (FR)

(72) Inventors: Rémi Geraud, Valence (FR); Hiba Koudoussi, Paris (FR); David Naccache, Paris (FR)

(73) Assignee: Banks and Acquirers International Holding, Suresnes (FR)

( * ) Notice: Subject to any disclaimer, the term of this patent is extended or adjusted under 35 U.S.C. 154(b) by 168 days.

(21) Appl. No.: 18/005,446

(22) PCT Filed: Jul. 8, 2021

(86) PCT No.: PCT/EP2021/069067
§ 371 (c)(1),
(2) Date: Jan. 13, 2023

(87) PCT Pub. No.: WO2022/013071
PCT Pub. Date: Jan. 20, 2022

(65) Prior Publication Data
US 2023/0267106 A1    Aug. 24, 2023

(30) Foreign Application Priority Data
Jul. 15, 2020   (FR) ......................................... 2007424

(51) Int. Cl.
*G06F 16/22*    (2019.01)
(52) U.S. Cl.
CPC .................................. *G06F 16/22* (2019.01)

(58) Field of Classification Search
CPC ...................................................... G06F 16/22
See application file for complete search history.

(56) References Cited

U.S. PATENT DOCUMENTS

| 5,924,077 A | * | 7/1999 | Beach | G06Q 20/202 |
| | | | | 705/7.29 |
| 2005/0086203 A1 | * | 4/2005 | Gauweiler | G06F 16/972 |
| (Continued) | | | | |

OTHER PUBLICATIONS

English translation of the Written Opinion of the International Searching Authority dated Oct. 5, 2021 for corresponding International Application No. PCT/EP2021/069067, filed Jul. 8, 2021.

(Continued)

*Primary Examiner* — Jensen Hu
(74) *Attorney, Agent, or Firm* — David D. Brush; Westman, Champlin & Koehler, P.A.

(57) ABSTRACT

A method for processing data insertion and/or modification requests, which is implemented by an electronic processing device including a communication interface to receive the requests from a communication network. The method includes distributing data, within a plurality of buffers. Each buffer is associated with a record of a database. The association is made via a database record identifier present within the received insertion and/or modification requests. The data is inserted in the form of buffer records, including a value to be updated in and/or inserted into the database. The method also includes allocating data within the records of the database, from the buffers of the plurality of buffers. The allocation phase includes, for the buffer records that include an operational marking, executing, from a configuration file, a computer program specifically dedicated to the record and/or specifically dedicated to the data type of the value to be updated and/or inserted.

11 Claims, 3 Drawing Sheets

(56) References Cited

U.S. PATENT DOCUMENTS

Figure 1:
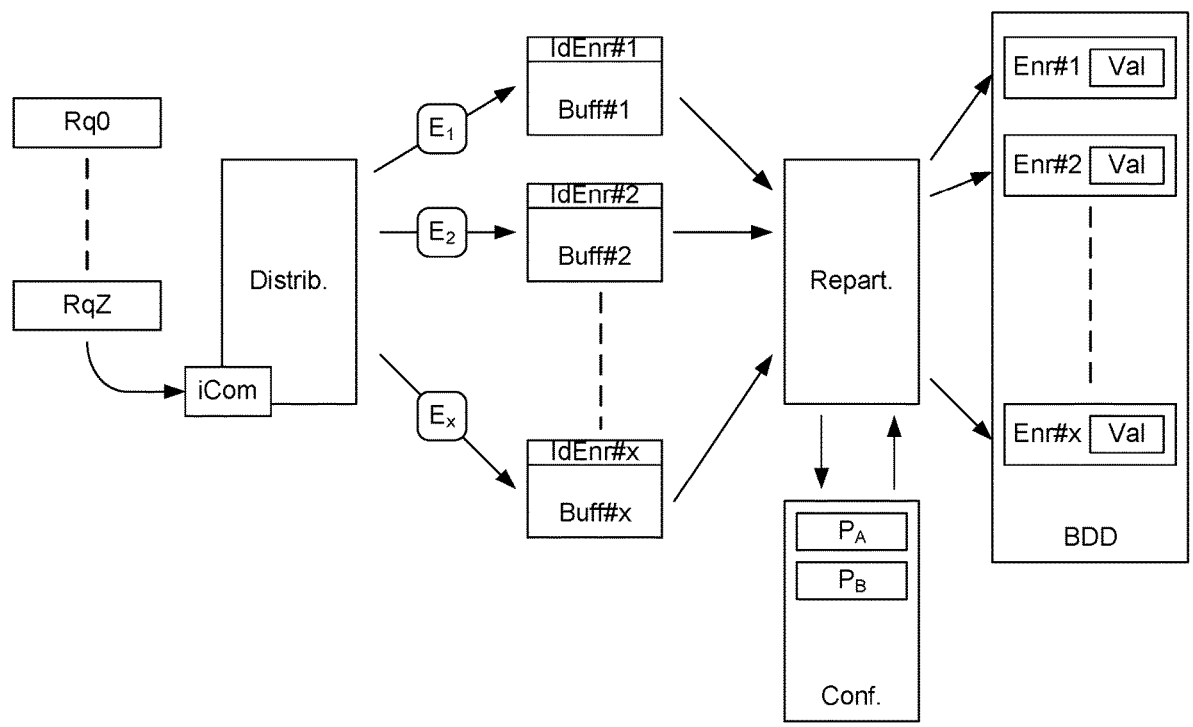

| | | | |
|---|---|---|---|
| 2009/0165003 A1* | 6/2009 | Jacobson | G06F 9/5033 |
| | | | 718/102 |
| 2011/0173619 A1* | 7/2011 | Fish | G06F 16/2365 |
| | | | 718/101 |
| 2013/0091105 A1* | 4/2013 | Bhave | G06F 16/27 |
| | | | 707/693 |
| 2015/0213071 A1 | 7/2015 | Alvey et al. | |
| 2017/0039218 A1* | 2/2017 | Prahlad | G06F 3/0631 |
| 2018/0013692 A1* | 1/2018 | Park | H04L 67/535 |
| 2019/0205183 A1* | 7/2019 | Provencher | G06F 9/44505 |
| 2019/0238394 A1* | 8/2019 | Watkins | H04L 41/044 |
| 2020/0403844 A1* | 12/2020 | Greene | G06F 16/9574 |
| 2021/0216517 A1* | 7/2021 | Graefe | G06F 16/2246 |

OTHER PUBLICATIONS

International Search Report dated Oct. 5, 2021 for corresponding International Application No. PCT/EP2021/069067, filed Jul. 8, 2021.

Written Opinion of the International Searching Authority dated Oct. 5, 2021 for corresponding International Application No. PCT/EP2021/069067, filed Jul. 8, 2021.

French Search Report and Written Opinion with English machine translation dated Mar. 24, 2021 for corresponding French Application No. 2007424, filed Jul. 15, 2020.

Anonymous, "MySQL : MySQL 8.0 Reference Manual :: A.5 MySQL 8.0 FAQ: Triggers", May 1, 2020 (May 1, 2020), p. 1-4, Retrieved from the Internet: URL:http://web.archive.org/web/20200501082017/https://dev.mysql.com/doc/refman/8.0/en/faqs-triggers.html, XP055789704.

* cited by examiner

ELECTRONIC DEVICE FOR PROCESSING DATA UPDATE AND/OR INSERTION REQUESTS, METHOD AND CORRESPONDING PROGRAM

CROSS-REFERENCE TO RELATED APPLICATIONS

This Application is a Section 371 National Stage Application of International Application No. PCT/EP2021/069067, filed Jul. 8, 2021, which is incorporated by reference in its entirety and published as WO 2022/013071 A1 on Jan. 20, 2022, not in English.

1. FIELD

The invention relates to the optimisation of code, derived from a transactional request, within a database system managing a plurality of counting units. More particularly, the invention relates to optimising the execution of the initial transactional request according to an optimisation scheme which takes account of values contained in the database system, according to values of fields associated with records in the database.

2. PRIOR ART

Computerised systems have changed many aspects of modern life. Computerised systems are increasingly used, autonomously, to perform management, harmonisation or dispatching tasks. This is for example the case of computerised systems related to robotics, which can be called mechatronics. Such systems are, for example, able to make decisions on the execution of actions, which are dependent on the environment in which the mechatronic system is located, without user intervention.

Increasingly, decisions are left to an automated, neural-type processor, which will perform required actions based on previously learned situations. Thus, from an initial request from a server or a user, the automated processing processor will perform actions resulting from a decision, itself resulting from a number of input parameters passing through one or more neural networks.

This mode of incoming data processing, especially in mechatronics, but also in automation is interesting in certain situations. For example, when input parameters vary within known, catalogued and previously learned amplitudes, systems based on machine learning can effectively be operational without requiring human intervention. On the other hand, when input values widely vary, or even when new input values corresponding to non-existent types arise, artificial intelligence requires human assistance, which makes their use more complex or less interesting.

There is therefore a need to make data processing, especially for automatic processing systems, simpler to implement, allowing for greater data scalability than existing mechanisms.

3. SUMMARY OF THE INVENTION

The method provided by the inventors does not rise these problems of prior art. Indeed, a method for distributing and dispatching database updates based on a record identifier and an implementation of an operational marking is provided.

More particularly, a method is provided for processing data insertion and/or modification requests, which method is implemented by an electronic processing device, comprising a communication interface for receiving said requests from a communication network. Such a method comprises a data distribution phase, within a plurality of buffers, each buffer being associated with a record of a database, the association being carried out via a database record identifier present within the insertion and/or modification requests received, said data being inserted as buffer records, comprising a value to be updated and/or inserted within the database; and a phase of dispatching, from the buffers of said plurality of buffers, data within the records of the database, said dispatching phase comprising, for the buffer records that comprise an operational marking, the execution from a configuration file, of a computer program specifically dedicated to said record and/or specifically dedicated to the data type of said value to be updated and/or inserted.

Thus, it is possible to process data insertion and/or update requests within a database more efficiently, by effectively dividing updates into mutualisable operations.

According to one particular feature, said data distribution phase comprises, for a current insertion and/or modification request received by the communication interface:
A step of extracting, from the current insertion and/or modification request, a database record identifier;
A step of searching, within the database, for a record corresponding to the previously extracted database record identifier, delivering a buffer identifier;
When the search is negative, a step of creating, in memory, a buffer associated with said record identifier;
A step of creating a current buffer record, comprising the value to be inserted or updated within the database; and
A step of inserting the previously created current buffer record within the buffer corresponding to said buffer identifier.

In this way, data distribution is carried out efficiently, ensuring that only one container (the buffer) is dedicated only to updating the field containing the value of the database record, increasing the efficiency of the system.

According to one particular feature, said step of creating the buffer record comprises:
A step of searching, within the current insertion and/or modification request, for a piece of data representative of operational marking;
When a piece of data representative of operational marking is found, a step of copying this piece of data within a marker field of the current buffer record;
When a piece of data representative of operational marking is not found, a step of searching, within a configuration file, for a possible default operational marking piece of data to be inserted;
When a piece of data representative of default operational marking is found, a step of copying this piece of data within the marker field of the current buffer record.

In this way, it is possible to constrain the implementation of an operation associated with the value of a record field in a simpler and more efficient way.

According to one particular feature, the step of creating the buffer record comprises:
A step of searching, within the current insertion and/or modification request, for a piece of data representative of time stamping;
When a piece of data representative of time stamping is found, a step of copying this piece of data within a date field of the current buffer record;
When a piece of data representative of time stamping is not found, a step of inserting a piece of data representative of the current date and/or time within the date field of the current buffer record.

In this way, it is possible to ensure, if necessary, that all the updates of a field of a record with a given value are carried out according to a precise time constraint, not necessarily related to the actual order of arrival of the request within the system.

According to one particular feature, the dispatching phase comprises, for a current buffer record of a buffer being processed:
- a step of determining processing to be performed with respect to said value to be updated and/or inserted from said buffer record; and
- a step of performing said processing determined in the previous step;
- a step of updating said record within the database according to the value to be updated and/or inserted and according to the result of execution of said processing previously determined when such processing has been implemented and has delivered a result accordingly.

Thus, it is possible to favour specific processing operations on some values of some record fields without the need to modify large amounts of code.

According to one particular feature, the step of performing said processing comprises:
- a step of determining, within the database, a record related to said record identified by the database record identifier, within which a calculated part of the value to be updated and/or inserted may be inserted and/or updated;
- a step of creating, within a buffer associated with said related database record, a buffer record, based on the current buffer record, and comprising said calculated part of the value to be updated and/or inserted.

Thus, it is possible to efficiently dispatch values or portions of values within the buffers according to capacities of receptacles.

According to one particular feature, said dispatching phase is implemented in series, so that all records of a current buffer are processed before processing the records of the next buffer.

According to one particular feature, said dispatching phase is implemented in parallel, so that the records of all buffers are processed according to a time stamp piece of data associated with each buffer record, processing first the record whose date and/or time is the oldest with respect to the date and/or time of all buffer records of all buffers.

According to another aspect, the invention also relates to a device for processing data insertion and/or modification requests, the device comprising a processor, a memory and a communication interface for receiving said requests from a communication network, the device being characterised in that it comprises means for distributing data, within a plurality of buffers, each buffer being associated with a record of a database, the association being effected via a database record identifier present within the insertion and/or modification requests received, said data being inserted as buffer records comprising a value to be updated and/or inserted within the database; and means for dispatching, from the buffers of said plurality of buffers, data within the database records, said dispatching phase comprising, for the buffer records that comprise an operational marking, the execution from a configuration file, of a computer program specifically dedicated to said record and/or specifically dedicated to the data type of said value to be updated and/or inserted within the database.

According to one preferred implementation, the different steps of the methods according to the invention are implemented by one or more software programs or computer programs, comprising software instructions to be executed by a data processor of a relay module according to the invention and being designed to control execution of the different steps of the methods.

Accordingly, the invention is also directed to a program, capable of being executed by a computer or data processor, which program includes instructions for controlling execution of the steps of a method as mentioned above.

This program may use any programming language, and be in the form of source code, object code, or code intermediate between source and object code, such as in a partially compiled form, or in any other desirable form.

The invention is also directed to a data medium readable by a data processor, and including instructions of a program as mentioned above.

The information medium may be any entity or device capable of storing the programme. For example, the medium may comprise a storage medium, such as a ROM, e.g. a CD ROM or a microelectronic circuit ROM, or a magnetic recording medium, e.g. a mobile medium (memory card) or a hard disk.

On the other hand, the information medium may be a transmissible medium such as an electrical or optical signal, which may be conveyed via an electrical or optical cable, by radio or by other means. The program according to the invention may in particular be downloaded on a network such as the Internet.

Alternatively, the information medium may be an integrated circuit in which the program is incorporated, the circuit being adapted to execute or to be used in the execution of the method in question.

According to one embodiment, the invention is implemented by means of software and/or hardware components. In this respect, the term "module" may be used herein to refer to a software component, a hardware component or a combination of hardware and software components.

A software component corresponds to one or more computer programs, one or more sub-programs of a program, or more generally to any element of a program or software capable of implementing a function or a set of functions, as described below for the module concerned. Such a software component is executed by a data processor of a physical entity (terminal, server, gateway, set-top-box, router, etc.) and is capable of accessing the hardware resources of this physical entity (memories, recording media, communication buses, electronic input/output cards, user interfaces, etc.).

Similarly, a hardware component is any element of a hardware assembly capable of implementing a function or set of functions, as described below for the module concerned. It may be a programmable hardware component or one with an integrated processor for executing software, for example an integrated circuit, a chip card, a memory card, an electronic card for executing firmware, etc.

Each component of the system described above naturally implements its own software modules.

The different embodiments mentioned above can be combined with each other for the implementation of the invention.

4. FIGURES

Figure 3:
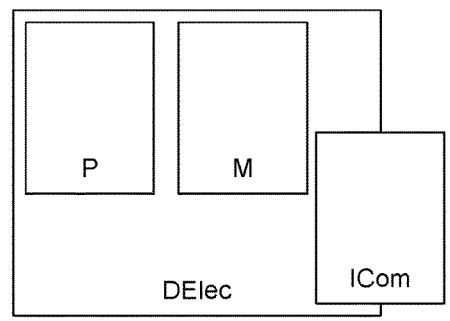
Figure 2:
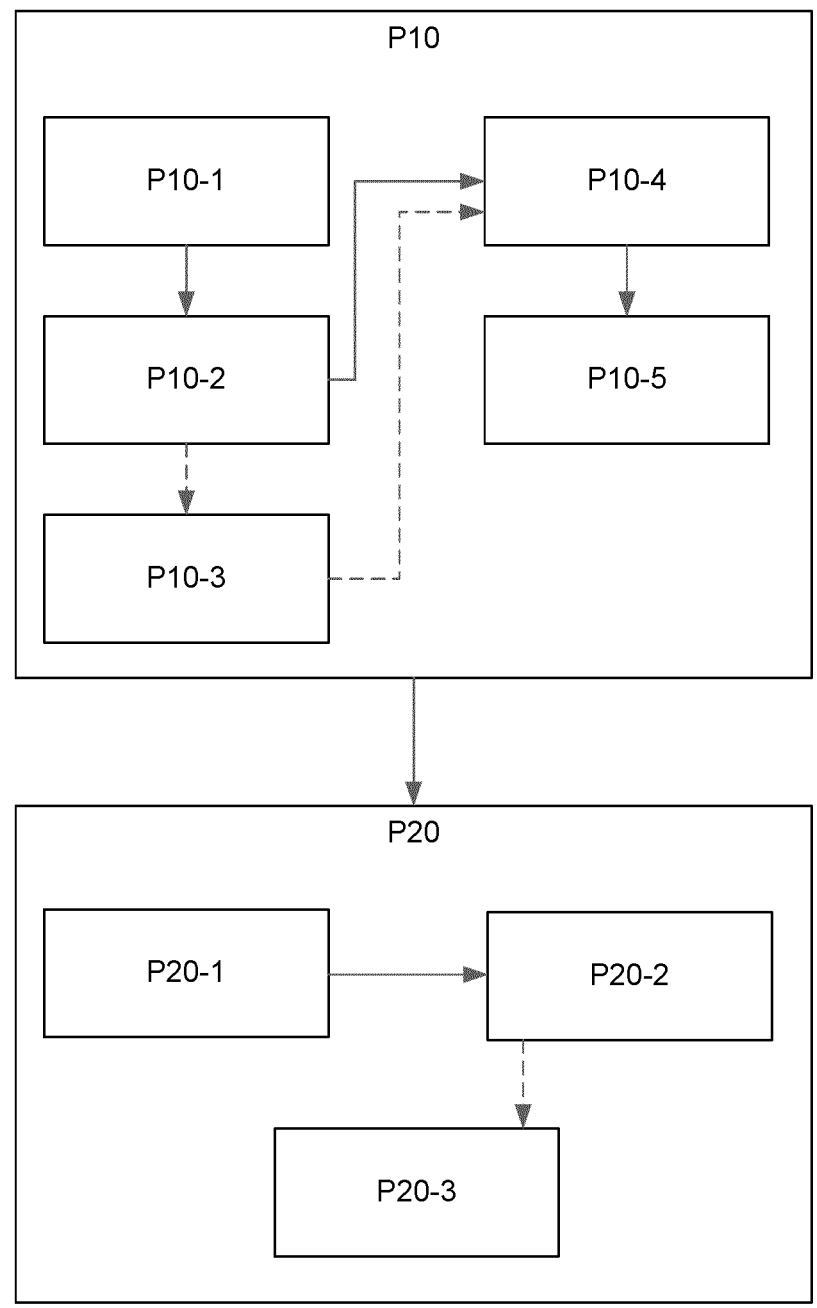
Figure 4:
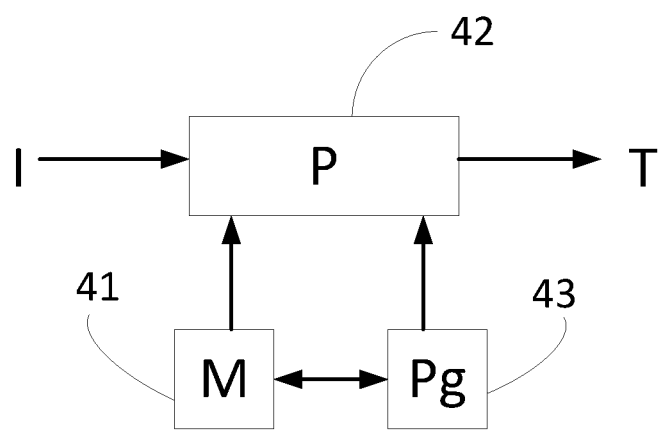

Other features and advantages of the invention will become clearer from the following description of a preferred embodiment, given merely as an illustrative and non-limiting example, and from the appended drawings, of which:

FIG. 1 describes the general principle of the invention;

FIG. 2 describes the different steps of the method in one exemplary embodiment;

FIG. 3 briefly illustrates a device able to implement the system of the invention;

FIG. 4 a diagram of simplified architecture of an electronic execution device capable of carrying out the code processing and execution according to at least one of the methods described herein.

5. DETAILED DESCRIPTION

5.1. Description of One Embodiment

As explained previously, it is an object of the invention to enable optimisation of the dispatching of actions resulting from receipt of a request comprising an instruction to insert or update at least one piece of data representative of an amount (e.g. an amount of time, an amount of water, an amount of electricity, wood, etc.) in dependence on data representative of the amounts existing in one or more depositories or receptacles within a database. The database in question is not necessarily a relational database, and may depending on the embodiments and operational implementations take the form of flat files, registers in a RAM or fields in a flat file or actually database record fields. To do this, two complementary techniques are implemented: on the one hand, a distribution technique, implemented by a distributor component, for distributing data received in the data insertion or update requests (known as incoming requests), possibly associated with an operational marking, and on the other hand, a technique for balancing the dispatching of the amount (to be inserted or updated) within a set of records likely to accommodate an insertion/update of said value, and for applying the operational marking at the time of insertion/update. Once updated or inserted, the value is optionally consumed or counted, depending on the embodiment and operational implementation.

The system is briefly described in connection with FIG. 1. It comprises two main components: the distributor (Dsitrib.) and the dispatcher (Repart.). The dispatcher (Dsitrib.) receives, via a communication interface (iCom), a set of requests (Rq0, . . . RqZ) whose objects are the insertion and/or update of records (Enr #1, Enr #2, . . . , Enr #x) within a database. The distributor (Dsitrib.) extracts data (explained below) from these requests, and in particular a record identifier (IdEnr #1, IdEnr #2, . . . IdEnr #x) allowing the determination of the record (Enr #1, Enr #2, . . . , Enr #x) within which the insertion and/or update is to be performed. The distributor (Dsitrib.) creates, from the data of the request being processed, a so-called buffer record (E1, E2, . . . , Ex) associated with the record identifier (IdEnr #1, IdEnr #2, . . . IdEnr #x), and inserts (E1, E2, . . . , Ex) this buffer record into the buffer (Buff #1, Buff #2, . . . , Buff #x) associated with the record identifier (IdEnr #1, IdEnr #2, . . . IdEnr #x). There is one buffer per record identifier. Possibly, time stamping is applied. An operational marking may also be present or dynamically performed when the buffer record (E1, E2, . . . , Ex) is created. The dispatcher (Repart.) in turn is responsible for the actual updating of data in the database (BDD). It processes the buffer records (E1, E2, . . . , Ex) according to a dynamic processing method (serial, parallel or mixed, as described below) and uses the operational marking of the buffer records (E1, E2, . . . , Ex) to obtain, from a configuration file (Conf.), and execute a program (PA, PB, etc.) associated with the type of data and/or the value of this piece of data in the buffer record being processed. The programs (PA, PB, etc.) may be programs defined by configurators and/or users, to perform predefined functions associated with the record or value type processed. These programs (PA, PB, etc.) may or may not modify the value (val) finally updated or inserted in the database records (Enr #1, Enr #2, . . . , Enr #x).

Thus, a database record (BDD) includes (at least) one value to be updated and each buffer (Buff #1, Buff #2, . . . , Buff #x) is associated with the update (cumulative or programmatic) of at least one value, of at least one database record. As set out, the distributor distributes inserts/updates to buffers according to distribution criteria of incoming requests and creates buffer records. The dispatcher (Repart.) updates data in the database (BDD). It processes the buffer records (E1, E2, . . . , Ex) of each of the buffers, to update the database, either by accumulating the updates inserted in the buffers, or in another way, as explained later.

Thus, unlike prior art systems, there is no need for artificial intelligence systems to be able to balance value updates in various receptacles. The system is additionally scalable because it allows for optimal load dispatching in the update, for example by allowing cumulative updating (when there is no operational marking) and the processing method implemented by the dispatcher (Repart.) can be adapted in real time, for example according to an estimated load level in the buffers, by a scheduler (not shown).

An incoming request, received by the processing device, comprises a number of fields, including for example one or more of the following fields. The function of these fields is identified in the third column

TABLE 1

| Inbound request ID | <Pmt0InfId> | Internal identification code. |
|---|---|---|
| Checksum | <Ctrl1Sum0> | The system provides the total of each of the values. |
| Priority of instruction | <Pmt2TpInf><br><Instr3Prty> | Processing priority defined in processing options, allowing the distributor to mark such a priority to the dispatcher. |
| Date of execution | <Req4dExt> | Time stamping for time stamped processing. If it is empty, time stamping is made by the distributor. |
| Transmitter identifier | <Id5> | Transmitter identification: for knowing the original device |
| Unit of value | <C6cy> | Unit in which the value is expressed (e.g. litre, ampere, watt, force, linear momentum, cumulative, consumable or expendable unit) |
| Value | <Val7> | Value: this is the unit amount |
| Instruction identification | <Instr8Id> | The system generates a unique key for each request, including the record identifier, the transmitter, the execution date and a verification control number (not listed). |
| Database record ID | <Cdtr9Acct> | The system uses a database record code. This is the identifier used for the buffer. |
| Database ID | <Id10> | The system uses a base identification number, when several databases are present. |
| Object code | <Purp11><br><Cd12> | The system uses a request reason value defined in processing options to determine a possible reason code. If one of these fields is valued, it is the operational marking. |

FIG. 2 explains the two phases implemented:

a data distribution phase (P10), within a plurality of buffers, each buffer being associated with a database record, the association being made via a database record identifier present within the insertion and/or modification requests received, said data being inserted as buffer records, comprising a value to be updated and/or inserted within the database; in one exemplary embodiment the distribution phase (P10) comprises:

A step of extracting (P10-1), from the current insertion and/or modification request, a database record identifier;

A step of searching (P10-2), within the database, for a record corresponding to the previously extracted database record identifier, delivering a buffer identifier;

When the search is negative, a step of creating (P10-3), in memory, a buffer associated with said record identifier;

a step of creating (P10-4) a current buffer record, comprising the value to be inserted or updated within the database; and A step of inserting (P10-5) the previously created current buffer record within the buffer corresponding to said buffer identifier.

And a phase of dispatching (P20), from the buffers of said plurality of buffers, data within the database records, said dispatching phase comprising, for the buffer records which comprise an operational marking, the execution from a configuration file, of a computer program specifically dedicated to said record and/or specifically dedicated to the type of data of said value to be updated and/or inserted; in one exemplary embodiment, the dispatching phase (P20) comprises:

a step of determining (P20-1) processing to be performed with respect to said value to be updated and/or inserted from said buffer record; this determination is made, for example, according to an operational marking (an indicator) present in the buffer record; and a step of executing (P20-2) said processing determined in the previous step;

a step of updating (P20-3) said record within the database according to the value to be updated and/or inserted and according to the result of execution of said processing previously determined when such processing has been implemented and has delivered a result accordingly.

The advantage of proceeding in this way is that there is a synergistic effect between the distribution and the actual update. Indeed, as each buffer is associated with a database record, and as the association is made via a database record identifier present within the insertion and/or modification requests received, the dispatching phase (for buffer records which comprise an operational marking for which the execution from a configuration file, of a computer program specifically dedicated to said record and/or specifically dedicated to the data type of said value to be updated and/or inserted) is facilitated and gathered within the same buffer: it is necessary and sufficient to speed up processing, within the same buffer, to gather the records that are free of operational marking to perform a cumulative update from these buffer records and if there are still records with operational marking, to process these records afterwards, by performing the necessary operations (i.e. execution of a computer program). In this way, processing of buffers is optimised.

Thus, in general, the technique of the invention comprises two complementary parts. The first part consists in carrying out distribution, by the distributor, of the data received from the incoming requests: this distribution essentially depends on the identification, or not, of a database record (and possibly of a database) likely to be associated with the incoming request. When a database record can be associated with an incoming request (for example because the incoming request comprises an identifier of the database record), then so-called payload data of this incoming request is inserted, by the distributor, in a buffer associated with this database record. When no database record can be associated with an incoming request (for example because the identifier of the incoming request does not correspond to—or the request does not comprise—an identifier of the database record), then a buffer associated with the identifier of the request is created, by the distributor, and the payload of the incoming request is then inserted into this buffer; the data inserted into the buffers is optionally time stamped (for example when such time stamping does not already exist in the request).

An operational marking of the incoming request further allows categorisation of the value contained in the incoming request and which has to be inserted or updated in the record. More particularly, this operational marking can be done upstream (i.e. at the time of the elaboration of the request by the sender of the request) or dynamically, according to the execution parameters associated with the data distribution process. Thus, for example, when a value, for a given type, falls within a predetermined value range, then the distribution process (the distributor) can perform, on its own, operational marking of that value. Thus, the operational marking can be implemented dynamically or statically (static marking being present in the request when it is received in the system, and resulting from a marking operation performed prior to the receipt of the request in the system, as indicated in the fields of the previous request). Dynamic marking comprises a step of searching, within a configuration file (or a database), for a possible default operational marking piece of data to be inserted, for example according to the type of value (integer, real, double precision, character string) and/or the value itself (e.g. if the value exceeds a certain ceiling, is between two predetermined values, is below a given threshold, etc.) and/or the unit of the value (Ampere, Watt, Litre, any counting or countable unit). It is used to enable the system to perform specific processing on the value contained in the record, possibly in connection with related records of the record for which the value is intended. In other words, according to the invention, operational marking is a means for forcing execution of a value balancing operation, possibly using values contained in related or dependent records of the record within which the value contained in the incoming request is to be inserted or updated. According to the invention, a related record is, for example, a record in the database that is related to the current record. The relation between the related record and the current record may be of any nature: for example by a dependency relationship, an overflow relationship—i.e. when a record is full, it is dumped into another record, an ascendancy relationship—i.e. processing the related record as a priority before the current record.

Thus, as an example of dynamic marking, an incoming request comprises a value v1 of current intensity (measured in Amperes) associated with a record X included in a device current intensity configuration file (this configuration file being the database). The data distributor identifies that the value relates to a current intensity value; it searches within a configuration file to see whether an operational marking rule relates to current intensity type data. When at least one such rule is present, the data distributor performs comparison of the current intensity value with the rule(s) in question and performs dynamic operational marking if the result of one of these rules is positive. The piece of data representative of the marking is a function of the rule(s) in question. For example, the marking may be different depending on the value v1. For example, if v1 exceeds 2 A, the marking may be of the #M1 type, whereas if the value of the intensity is between 1.5 A and 2 A, the marking may be of the #M2 type. Generally speaking, it is noticed that the data distributor is not informed of the meaning of the marking it makes. It only has a marking indication which it transcribes according to tests and reference values present in a configuration base. Furthermore, marking can be automatic, regardless of the value, that is marking is not correlated to the implementation of a test on the value (marking related for example to the type, unit or any other consideration).

When the incoming request is already marked (i.e. the marking has been done by the sender of the incoming request), a specific field of the incoming request includes the operational marking indication, as explained above. In this case, the distributor can check that the marking is correct, or it can do nothing and simply transcribe the marking made. The scheduler can be informed of this marking (in the form of a counter or a percentage of the requests marked), for example for load management (balancing of the dispatch made by the dispatcher) or to manage scalability of the system.

Depending on the embodiments, the incoming request is inserted into a message, the message being received by the communication interface of the electronic device. A message may comprise several incoming requests, from the same sender. Each incoming request in the message may relate to different database records. A message typically comprises the following information:

TABLE 2

| Message identification | <MsgId> |
|---|---|
| Date and time of creation | <CreDtTm> |
| Number of incoming requests | <NbOfTxs> |
| Checksum | <CtrlSum> |
| Issuer's identifier | <Id> |

What has just been described for electrical intensity is also valid for other types of quantitative data, as described previously.

These buffers are then processed by another component, called a dispatcher, responsible for dispatching and balancing the values, which constitutes the second part of the technique of the invention.

More particularly, the dispatcher (or dispatching component) is responsible for the actual updating of the database, from the record buffers previously valued and/or created by the dispatching component (distributor). The operating mode of the dispatcher can be serial, parallel or mixed and can be dynamically modified according to the overall load of the system, measured by the scheduler (i.e. number of records waiting in the buffers, percentage of records with an operational marking, number of incoming requests to the distributor). The scheduler is therefore responsible for measuring the adaptation of processing operations carried out to the conditions experienced or encountered by the system. In particular, it manages the dispatcher operating mode, and operations performed by the dispatcher. It is also able to manage dynamic marking of incoming requests, if necessary, still with the aim of system stability.

The operating principle is as follows: for a given buffer, associated with a database record, the dispatcher performs actions for updating the value or creating the record (and inserting the value into the record created).

Thus, for each buffer, the dispatcher performs the following operations:
  Optionally, a concatenation (sum) of all or part of the buffer values, in order to obtain a final value; the final value can be positive, negative or equal to zero: the final value can be directly used to update the value of the record in the database, without performing unit operations corresponding to each record in the buffer; for example, if the unit of the value is "Watt", litre, kilogram or any other counting or accumulation unit, and the final value is "−50", it is possible to add this value directly to the record identified by the buffer; such an operation can be performed, for example, only on buffer values whose records do not comprise operational marking; this optional step is reserved for some situations where such an update can be performed without operational constraints;
  an iteration, comprising for each record in the buffer:
    a step of checking for the presence of an operational marker associated with said buffer record; and
    when an operational marker is present:
      a step of determining processing to be performed with respect to said value of said buffer record; and
      a step of executing said processing determined beforehand.

The processing to be executed is determined by searching within a configuration file for a specific processing associated with an operational marking identifier. This may be a dispatching processing performed from the value of the record in the buffer. For example, the operational marking references, within the configuration file, a computer program to be executed, taking as an input the value of the record in the buffer. This computer program may be in the form of scripted code, virtual machine pseudocode or compiled code, adapted to be executed on the device performing processing. The computer program is predefined, by a user or by a configurator, to perform a number of specific tasks mainly depending on the value of the buffer record. Such modularity makes it possible to easily carry out new processing operations on incoming data without the need to completely modify a processing chain. Any type of processing can be carried out. Primarily, the purpose of such processing is to balance or dispatch "reservoirs", depending on the value of the record and possibly other information related to the incoming request. For example, when the incoming value relates to a number of steps to be performed on an actuator (such as a stepper motor), the processing may consist in checking that the number of steps in the value does not exceed a predetermined number of steps and, if so, dispatching the number of steps between the designated actuator and another actuator previously identified by another record in the database. This type of processing is useful in that it avoids problems of exceeding capacity that can be caused by the reception of requests that are not necessarily "adapted" to the capacities (hardware, software, or any other type) of the receptacle. This offers a certain scalability to the system: it is possible to manage load increases or changes in the scale of values received and to be inserted or updated in the database by only modifying specific computer programs adapted to a given record (and therefore to a given functionality).

In another configuration, the technique described allows monetary values to be assigned to different accounting accounts in a simple and efficient way, including in high frequency.

Another example, in the "logistics" domain, is to manage the capacity of a storage centre. If the record relates to a volume of pallets to be stored in a first section of the storage centre, the automated processing may consist in identifying a maximum capacity of this first section, then determining whether the value will result in this capacity being exceeded; and if so, identifying a second section of the storage centre (i.e. a new database record of the same type), making a difference between the original value and the maximum capacity of the first section, delivering a "differential value", and generating, in a buffer associated with the second section (a buffer associated with that database record), a new buffer record comprising that differential value and operational marking (which is of the same type as the one associated with the first section of the storage centre) so that similar processing can be performed.

Generally speaking, time stamping performed on buffer records newly added by processing performed by the dispatcher is identical to time stamping of the initial buffer record. This ensures that all processing operations that are performed are carried out in the order in which they are received. This scheduling, which is preserved by the technique described, is important in two ways:

Firstly, it ensures that values are updated consistently with the receipt of requests within the system;

secondly, it ensures a progressive update and implementation of the dispatching processing operations associated with the different operational markings.

Generally speaking, there are three possibilities for processing buffers, depending essentially on the operating system: series, parallel or mixed.

A first possibility is to process buffers one after the other. The buffers are then scheduled (essentially, a scheduling parameter is used to determine the order in which buffers will be processed). The dispatcher then takes as an input the buffer whose processing is to be carried out according to its order and manages the whole of this buffer, according to the mechanism described previously. When the processing of the current buffer is complete, the method moves on to the next buffer. As indicated previously, when data are time stamped within the buffer, records in the buffer are processed according to this time stamping. Optionally, when the date and/or time of the buffer record is greater than the current date and/or time, the record is not processed. It will be processed when the current date and/or time is greater than or equal to the date and/or time of the buffer record. This makes it possible to receive, in advance, additions or updates to be carried out without them being carried out immediately, and therefore to solve some problems related to possible network congestion or possible transmission problems or update anticipations, for example.

A second possibility is to process buffer records one after the other, without taking the buffer to which they belong into account. In this case, the dispatcher takes as an input the buffer record with the oldest date and/or time and performs the update and/or addition associated with this buffer, possibly by appending processing thereto in the event of operational marking. In this case, all the buffers are processed in parallel, whereas in the first possibility, buffers are processed in series. This second possibility is more real-time oriented and allows for the competitive updating of database records, particularly when the frequency of update requests is high and many records are referenced. Conversely, serial processing of buffers ensures record update efficiency since the final state of a database record is known much more quickly, which is not the case with the second processing possibility, which implies that the system reaches a steady state (corresponding to the processing of all the buffers and therefore all the records in the database) much later, the steady state of the system being obtained during the last round of processing of the buffer records.

In the end, the technique provided ensures that value additions and updates are carried out in a simple and efficient manner while providing some resistance to error and simple scaling.

5.2. Description of One Exemplary Embodiment

In this exemplary embodiment, the application of the abovementioned technique to the updating of an actuation or activation piece of data within an electronic device (Delec), for example of the robotic type is described. More particularly, in connection with FIG. 2, such a device comprises a processor (P), a memory (M) and at least one communication interface (Icom). The communication interface (Icom) is able to receive, from a communication network with which the electronic device (Delec) is connected, one or more update requests, data insertion, via messages.

As explained previously, a request is in the form of a message that comprises a requesting data structure. The requesting data structure comprises a predetermined number of fields, including a record identifier. At least one of these fields comprises a value to be inserted or updated in a database managed within the electronic device (Delec). The database comprises a number of records, each record comprising at least one field likely to be updated or created based on values from requests from one or more other devices, via the communication network.

Records are typed, as is the piece of data to be updated, and records include an identifier field. For example, a record may relate to an actuator, and the value associated with that actuator may be binary (0: actuator not activated; 1: actuator activated). In yet another example, a record may relate to a light emitting diode, and the value associated with that diode may be an integer between 0 and 256, each value being representative of a brightness of the diode: 0: diode off; 256: maximum lighting; 128: half-intensity lighting. Also in this example, records may relate to amounts of time and/or numbers of revolutions to be performed by a servo motor or numbers of revolutions (performed by a motor) to be controlled by a control probe. In this example, therefore, each field in the database relates to at least one element of the electronic device in question.

This database may in this exemplary embodiment take the form of a set of predetermined registers of the electronic device, each register being intended to participate in the control (activation, deactivation, modification of behaviour) of one or more elements of the electronic device itself (or of another device to which the electronic device is connected). In any case, in this example, the method previously described is implemented to carry out, on the one hand, reception of the insertion or update request, through a first process. This first process is implemented by the processor, in real time, using a computer process for receiving and distributing requests. This distribution process implements the distribution (processing and allocation) method as described above. More particularly in this example, the process comprises, in a permanent manner (i.e. at least one iteration of the steps):

Monitoring a receipt, at the communication interface (Icom), of a data update/insertion request, known as an incoming request; and When a request is received on the communication interface (ICOm):

Extracting a record identifier from said request;

Checking, within the database, for the presence of a record comprising said record identifier extracted from said request;

When a record exists that comprises the record identifier, inserting the useful fields of the incoming request into a buffer associated with said record, optionally accompanied with time stamping;

Where there is no record comprising the record identifier, creating an associate with said record and inserting the useful fields of the incoming request into this buffer, optionally accompanied with time stamping.

The useful fields of the incoming request are of various kinds. In this exemplary embodiment, however, the following fields are necessarily present:

Origin of the incoming request, for example identifier of an electronic device transmitting the incoming request or identifier of an entity that transmitted the incoming request;

Value to be inserted/updated;

Unit of the value to be inserted/updated;

Identifier of the record within which the value is to be inserted/updated.

Optionally, the incoming request may also include an operational marking field, as described previously. The operational marking field is a field for processing the value to be inserted/updated according to a specific procedure, several examples of which are explained later.

Thus, the communication interface (ICOm) is continuously monitored by the distribution process. When an incoming request is identified on the communication interface (ICOm), the distribution method takes on checking the validity of the incoming request and assigning it to a destination buffer, possibly with time stamping of the request payload. The request itself can also be stored in another data receptacle, for example for subsequent analysis and processing. It should also be noted that the communication interface can be used to transmit and receive data other than incoming requests. In particular, this communication interface can be used to transmit and/or receive diagnostic data, for example, or readings of operations carried out.

Each destination buffer is continuously processed. More particularly, in this exemplary embodiment, the dispatching process (dispatcher) is also implemented in real time and continuously. Such an implementation is adapted to the context and could be different in other contexts. In any case, the dispatching process, as described above, in this example processes buffers in parallel, essentially according to the time stamping of the buffer records. This means that the buffer records are all processed at the same time, according to the date and/or time they have, as explained above.

What is described here in the scope of an electronic movement management device can also be implemented in any other type of value allocation and/or updating system.

For each buffer record, the following process is executed:

a step of checking for the presence of an operational marker associated with said buffer record; and when an operational marker is present:

a step of determining processing to be performed with respect to said value of said buffer record; and a step of executing said processing determined in the previous step, said processing being in the form of an executable machine code;

a step of updating said record within the database according to the value to be inserted/updated and according to the result of execution of said processing previously determined if such processing has been implemented and has delivered a result accordingly;

a step of consuming said value of said database record updated;

In the exemplary embodiment, the consumption of the record value consists of its use by the actuator or component with which the record is associated. For example, in the case of a step number of a stepper motor, the consumption consists in implementing the stepper motor for the number of steps corresponding to the record value. In the case of a current intensity value, the component to be recorded consumes the value by adjusting the current intensity according to that value. In the case of a power value, the power is adjusted to the value indicated.

5.3. Other Features and Advantages

The following features are additionally set out. The insertion/modification requests comprise one or more pieces of data to be inserted (or modified) in one or more fields of one or more records. The distributor performs distribution of these updates/insertions according to the data and therefore creates buffers to stack these insertions/updates. Thus, a request may contain one or more record identifiers. In the majority of cases, however, the request contains one record identifier. Furthermore, data distribution in the buffers is essentially guided by the record identifier(s) present within the request: when the identifier is already present in the database, the buffer, a priori, already exists and therefore this buffer is used; when the identifier is absent in the database, as indicated previously, a new buffer is created. Thus, an association is made by the identifier(s) present within the request. A buffer record is created for each identifier present in the request (if there are several) and the buffer record is inserted into this buffer, possibly with the addition of operational marking (i.e. an indicator) which may correspond to a present marking or a marking depending on the identifier of the record in the database. During dispatch, for each buffer, the buffer records may be processed in batches or individually, and when an operational marking is present, checking or obtaining a configuration file or directly a program. The configuration file may include instructions (parameters) for the execution of a parameterisable program (i.e. the configuration file including the parameters is loaded through the indicator and the parameterisable program uses this file to execute). Either the program itself performs the database insertion/update and dispatches the data, or it performs other operations and the database insertion/update, within the database records, is performed afterwards. Whichever method is employed, the updates/insertions are performed using the identifier of the record to which the record buffer relates.

In connection with FIG. 4, a simplified architecture of an electronic execution device capable of carrying out the code processing and execution according to at least one of the methods described above is set forth. An electronic execution device comprises a memory 41 (and/or possibly secured and/or two separate memories, one secured and the other not), a processing unit 42 equipped for example with a microprocessor (and/or possibly secured and/or two separate processors, one secured and the other not), and driven by the computer program 43, implementing all or part of the methods as previously described. In at least one embodiment, the invention is implemented at least partially in the form of a set of software and/or hardware components integrated into this device, which may be in the form of one or two servers connected to a communication network. This provides a device (or a system in the case of a plurality of servers) for processing data insertion and/or modification requests, which device comprises a processor, a memory and a communication interface for receiving said requests from a communication network. This device comprises means for distributing data, within a plurality of buffers, in the memory of the device (or of the system), each buffer being associated with a record of a database, the association being carried out via a database record identifier present within the insertion and/or modification requests received, said data being inserted as buffer records comprising a value to be updated and/or inserted within the database; and means for dispatching, from the buffers of said plurality of buffers, data within the records of the database, these dispatching means comprising, for the buffer records which comprise operational marking, means for executing, from a configuration file, a computer program specifically dedicated to said record and/or specifically dedicated to the data type of said value to be updated and/or inserted within the database.

For the execution of the functions entrusted thereto, the device also comprises the means for implementing all the previously mentioned steps, either in hardware form, when specific components are dedicated to these tasks, or in software form in connection with one or more microprograms executing on one or more processors of the execution device.

The invention claimed is:

1. A method for processing data insertion and/or modification requests, which is implemented by an electronic processing device comprising a communication interface for receiving said requests from a communication network, wherein the method comprises:
 a data distribution phase, within a plurality of buffers, each buffer being associated with a single record of a database, the association between each buffer and each record being made via a database record identifier present within the insertion and/or modification requests received, said data being inserted into respective buffers of the plurality of buffers as buffer records, comprising a value to be updated and/or inserted within the database; and
 a dispatching phase, comprising dispatching the data, from the buffers of said plurality of buffers to the records of the database, said dispatching phase comprising:
  for each buffer record, checking for presence of an operational marking associated with the buffer record, and
  in response to an operational marking being present for a buffer record of the plurality of buffer records:
   executing from a configuration file a computer program specifically dedicated to said buffer record and/or specifically dedicated to a data type of said value to be updated and/or inserted, and
   performing the dispatching into the associated record of the database based on the execution of the computer program.

2. The method according to claim 1, wherein said data distribution phase comprises, for a current insertion and/or modification request received by the communication interface:
 extracting, from the current insertion and/or modification request, the database record identifier;
 searching, within the database, for a record corresponding to the previously extracted database record identifier, delivering a buffer identifier;
 in response to the search being negative, creating, in memory, a buffer associated with said record identifier;
 creating a current buffer record comprising the value to be inserted or updated within the database; and
 inserting the previously created current buffer record into the buffer corresponding to said buffer identifier.

3. The method according to claim 2, wherein said creating the current buffer record comprises:
 searching, within the current insertion and/or modification request, for a piece of data representative of an operational marking;
 in response to a piece of data representative of an operational marking being found, copying this piece of data into a marking field of the current buffer record;
 in response to a piece of data representative of an operational marking being not found, searching, within a configuration file, for a possible default operational marking piece of data to be inserted; and
 in response to a piece of data representative of default operational marking being found, copying this piece of data within the marker field of the current buffer record.

4. The method according to claim 2, wherein said creating the buffer record comprises:
 searching, within the current insertion and/or modification request, for a piece of data representative of time stamping;
 in response to a piece of data representative of time stamping being found, copying this piece of data within a date field of the current buffer record; and
 in response to a piece of data representative of time stamping being not found, inserting a piece of data representative of the current date and/or time within the date field of the current buffer record.

5. The method according to claim 1, wherein said dispatching phase comprises, for a current buffer record of a current buffer of the plurality of buffers:
 determining processing to be executed with respect to said value to be updated and/or inserted of said buffer record;
 executing said determined processing; and
 updating said record within the database according to the value to be updated and/or inserted and according to a result of execution of said determined processing when such processing has been implemented and has delivered the result accordingly.

6. The processing method according to claim 5, wherein the executing said determined processing comprises:
 determining, within the database, a record related to said record identified by the database record identifier, within which a calculated part of the value to be updated and/or inserted may be inserted and/or updated; and
 creating, within a buffer associated with said related database record, a buffer record, based on the current buffer record, and comprising said calculated part of the value to be updated and/or inserted.

7. The processing method according to claim 1, wherein said dispatching phase is implemented in series, so that all records of a current buffer are processed before processing the records of the next buffer.

8. The processing method according to claim 1, wherein said dispatching phase is implemented in parallel, so that the records of all the buffers are processed as a function of a time stamping piece of data associated with each buffer record, by processing first the record whose date and/or time is the oldest with respect to the date and/or time of all the buffer records of all the buffers.

9. A device for processing data insertion and/or modification requests, the device comprising:
   a processor;
   a communication interface for receiving said requests from a communication network; and
   a non-transitory computer readable medium comprising instructions stored thereon which when executed by the processor configure the device to process the processing data insertion and/or modification requests by:
   implementing a data distribution phase, within a plurality of buffers, each buffer being associated with a single record of a database, the association between each buffer and each record being carried out via a database record identifier present within the insertion and/or modification requests received, said data being inserted into respective buffers of the plurality of buffers as buffer records comprising a value to be updated and/or inserted in the database; and
   implementing a dispatching phase, comprising dispatching the data, from the buffers of said plurality of buffers to the records of the database, the dispatching phase comprising:
      for each buffer record, checking for presence of an operational marking associated with the buffer record, and
      in response to an operational marking being present for a buffer record of the plurality of buffer records:
         executing from a configuration file a computer program specifically dedicated to said buffer record and/or specifically dedicated to a data type of said value to be updated and/or inserted within the database; and
         performing the dispatching into the associated record of the database based on the execution of the computer program.

10. A non-transitory computer readable medium comprising a computer program product stored thereon comprising program code instructions for executing a method for processing data insertion and/or modification requests when the instructions are executed by a processor of an electronic processing device, wherein the device comprises a communication interface for receiving said requests from a communication network and wherein the method comprises:
   a data distribution phase, within a plurality of buffers, each buffer being associated with a single record of a database, the association between each buffer and each record being made via a database record identifier present within the insertion and/or modification requests received, said data being inserted into respective buffers of the plurality of buffers as buffer records, comprising a value to be updated and/or inserted within the database; and
   a dispatching phase, comprising dispatching the data, from the buffers of said plurality of buffers to the records of the database, said dispatching phase comprising:
      for each buffer record, checking for presence of an operational marking associated with the buffer record, and
      in response to an operational marking being present for a buffer record of the plurality of buffer records:
         executing from a configuration file a computer program specifically dedicated to said buffer record and/or specifically dedicated to a data type of said value to be updated and/or inserted, and
         performing the dispatching into the associated record of the database based on the execution of the computer program.

11. The method according to claim 1, wherein the checking for presence of an operational marking comprises checking for presence of a piece of data representative of an operational marking in a field of the buffer record.

* * * * *